United States Patent [19]

Steiner

[11] 4,126,878
[45] Nov. 21, 1978

[54] OPTICAL FRAMING DEVICE FOR PHOTOGRAPHIC CAMERAS

[76] Inventor: Irving Steiner, 34 Edwards Rd., Mastic Beach, L.I., N.Y. 11951

[21] Appl. No.: 688,990

[22] Filed: May 24, 1976

[51] Int. Cl.² ............... G03B 11/00; G02B 27/02
[52] U.S. Cl. .................................. 354/296; 350/236
[58] Field of Search ............ 350/317, 60, 193, 194, 350/195, 204, 319, 58, 236; 354/295, 296

[56] References Cited

U.S. PATENT DOCUMENTS

| | | | |
|---|---|---|---|
| 2,845,835 | 8/1958 | Weiss | 350/60 |
| 3,639,040 | 2/1972 | Lytka, Sr. | 350/58 |
| 3,685,886 | 8/1972 | Nakajima et al. | 350/317 |
| 3,767,309 | 10/1973 | Brown et al. | 350/317 X |
| 3,774,992 | 11/1973 | Steiner | 354/296 X |
| 3,912,361 | 10/1975 | Bentley | 350/317 X |

Primary Examiner—Donald A. Griffin

Attorney, Agent, or Firm—Lackenbach, Lilling & Siegel

[57] ABSTRACT

A camera attachment adapted to be mounted about the lens of a camera comprising a hollow tubular or conical device having a plurality of concentrically or coaxially disposed rings or annular elements. Each ring comprises a plurality of colored sectional pieces or segments. All of the ring segments are fabricated from differently colored translucent materials and the segments of any ring may comprise equally sized angular segments or unequally sized angular segments. The device may comprise, for example, a plurality of rings forming a hood-like device having semi-circular segments or rings having more than two 180° segments, such as 90°, 120°, 30°, 5° or any other angular segment. With such a device, a plurality of randomly or uniformly spaced angular segments forming a multi-colored band of concentric rings may be formed about an image filmed with a camera having the device mounted about its lens.

14 Claims, 9 Drawing Figures

FIG.3
FIG.4
FIG.5
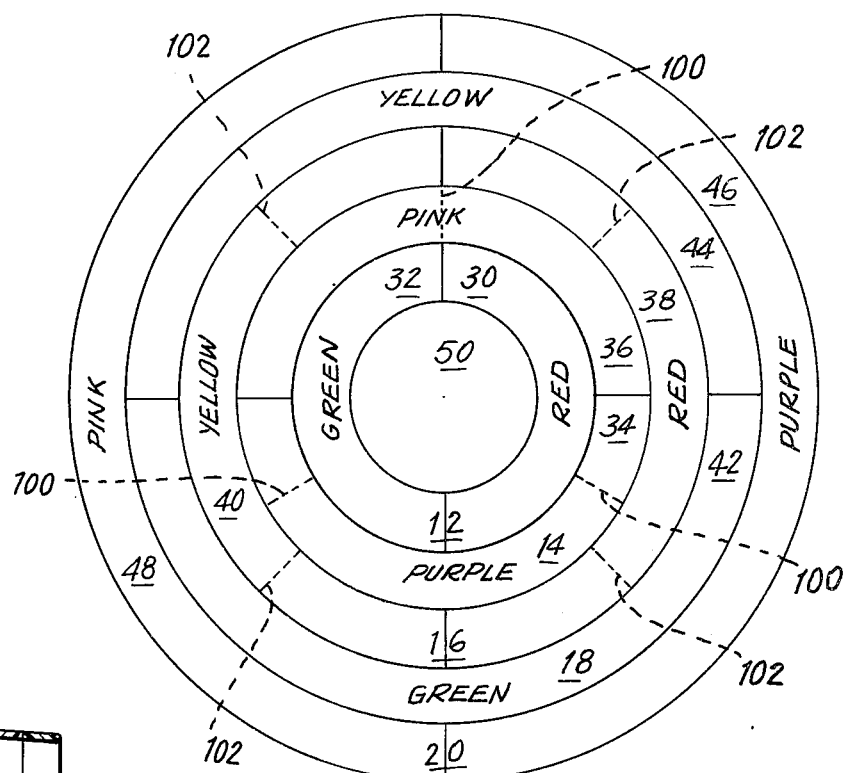
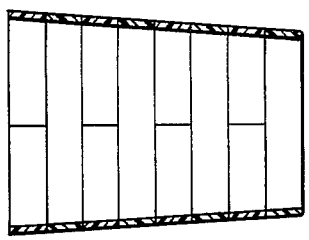
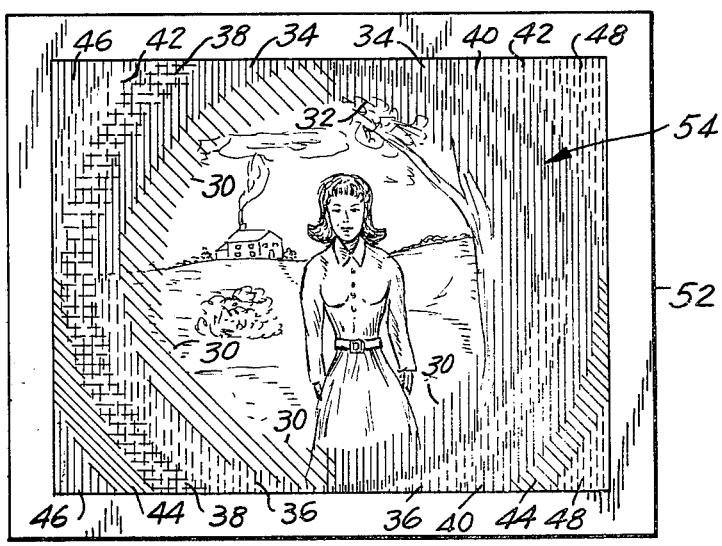

OPTICAL FRAMING DEVICE FOR PHOTOGRAPHIC CAMERAS

BACKGROUND AND SUMMARY OF THE INVENTION

This invention relates to an improved device for the modification of the recorded image in cameras. More particularly, it relates to such devices for the creation of segmentally diffused bands, borders or haloes around the subject in a camera.

In my U.S. Pat. No. 3,774,992, there is described a camera accessory device embodying a plurality of translucent and identically colored ring elements which form a rainbow-like halo effect of substantially concentric circular bands of light of different coloring or shading corresponding to each colored ring blended about the central image formed in the camera and on a developed photograph produced from film used in the camera.

With the present invention, I have further provided means which are capable of now incorporating additional coloration features to the recorded image, and one which is capable of changing the location of a color segment with respect to adjacent parallel color segments.

Accordingly, it is therefore a primary object of the present invention to provide a camera attachment capable of generating multi-colored bands of concentric configuration about the peripheral area of a photographic negative.

Another object of the invention is to provide a device which is capable of being adjusted so that the location of a color segment with respect to adjacent parallel color segments may be varied to add further coloration features about the peripheral area of any filmed object.

It is a further object of the invention to provide the camera device with means for storing same and with means for attaching same to a camera.

These and other objects and advantages of the invention will become apparent from a consideration of the following specification and claims, taken together with the accompanying drawings which form an integral part thereof.

DESCRIPTION OF THE DRAWINGS

The invention is described with reference to the accompanying drawings, in which:

FIG. 3 is a schematic representation of a plurality of concentric rings having two color segments of 180° each with all of the segments being uniformly disposed or distributed with respect to each other; and also showing in phantom other alternate ring structure arrangements;

FIG. 4 is a partial sectional view of an alternate camera device, wherein fixed ring elements are employed in contrast to ring elements capable of collapsing within each other in a nested fashion;

FIG. 5 is a representation of a photograph taken with the improved optical framing device of FIG. 3;

DESCRIPTION OF THE PREFERRED EMBODIMENTS

Figure 1:
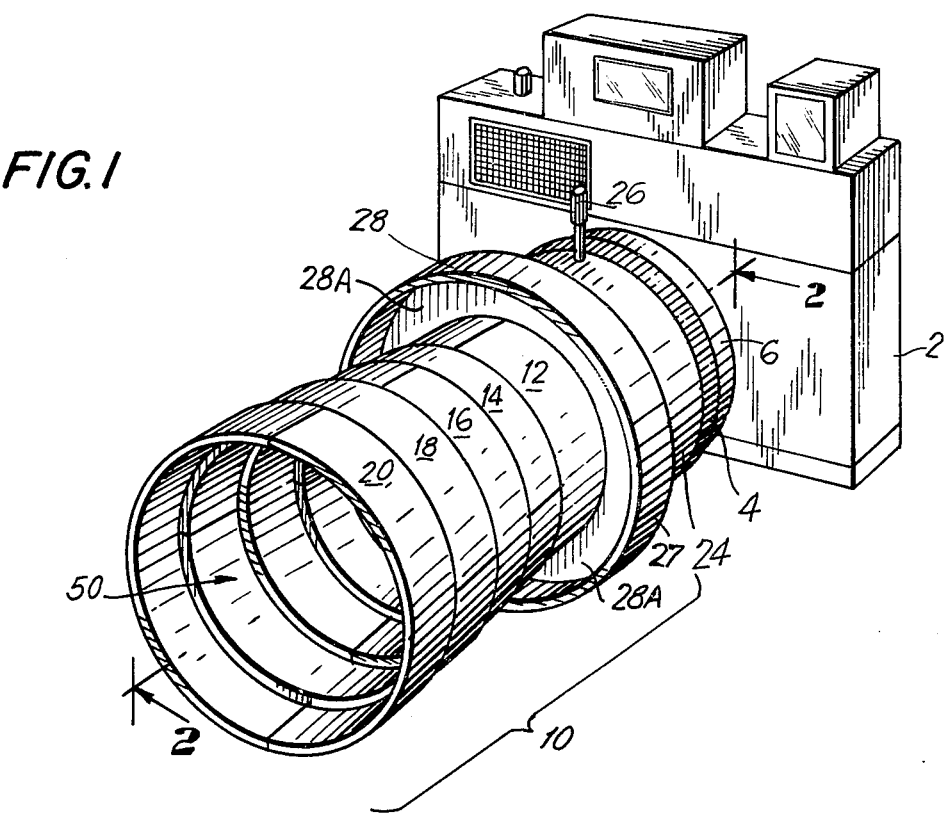
FIG. 1 is a perspective view of a hand held camera on which the improved optical framing device of the invention in mounted.
Figure 2:
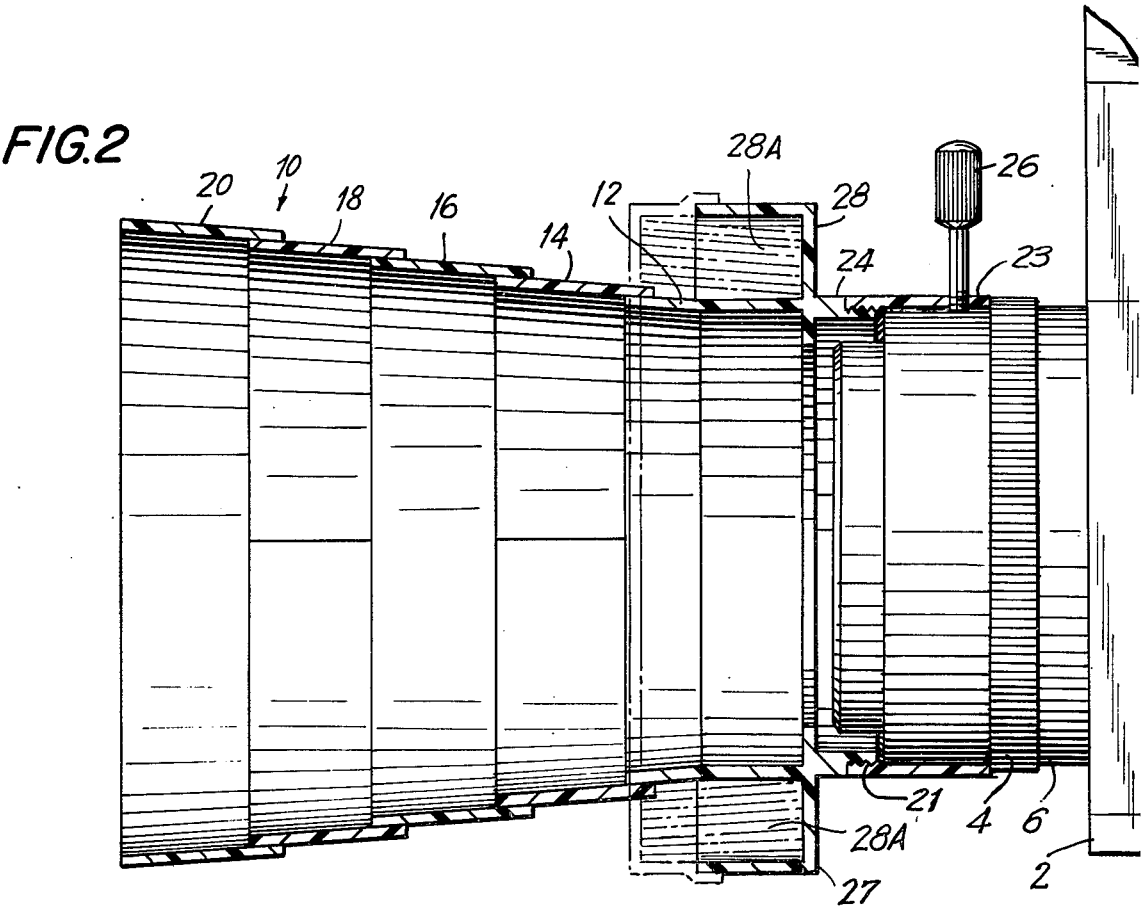
FIG. 2 is a cross-sectional view of the improved optical framing device, taken along the line 2—2 of FIG. 1.

In FIGS. 1 and 2, a 35 mm camera 2 of generally conventional construction is shown with the improved optical framing device 10 attached thereto. Any suitable camera 2 may be used with the device as long as the camera is capable of being adapted to permit the mounting of the device about its lens.

The device 10 is illustrated as having a base portion 22 and suitably five ring elements 12, 14, 16, 18 and 20. The base has a lower cylindrical portion 24 and optionally a housing portion 28. This lower portion 24 is somewhat tubular in shape and open at both ends and has a male threaded outer diameter 21 at one end which is adapted to be threaded or fitted about a suitable female threaded mounting sleeve 23 secured to the lens-mount 4 of the camera 2 by means of a thumb screw 25. Other conventional means well known in the art may also be used to mount the sleeve or the device to the camera in lieu of that shown and described herein. For example, the device may be joined to the camera as heretofor described in my aforementioned U.S. patent wherein a simple screw mount is employed directly.

Attached to the lower portion 24 is the suitable housing in the form of an enlarged cup-like portion 28 which extends outwardly away from the camera. This portion 28 may be made integral with the lower portion 24 and is made sufficiently large in outside diameter to form a recess 28A or storage cavity, to house and store all of the ring elements when the device 10 is collapsed into the cup-like housing. Suitably, the first ring 12 may be made integral with the base 20, if desired. This ring element may also be opaque or black in color, similar to a conventional shade ring.

Each successive ring, namely, the second ring 14, third (16), fourth (18) and fifth (20) has an inside diameter slightly larger than the outside diameter of the next smallest ring. These ring elements are manufactured in such a manner that they form a conical or funnel-shaped device when extended, and collapse together in a nested fashion one adjacent another in a flat parallel condition where each larger ring element rests outside the next smallest element. In actuality, the ring elements when extended maintain a tight fit together as the mating areas at their ends form a generally tight wedging joint.

In operation, the collapsible form of the device 10 is opened by simply pulling and/or twisting the rings right or left while taking them out of the housing. This action will cause the rings to frictionally lock in the open position as best shown in FIGS. 1 and 2. To close the rings, one simply pushes the rings in the opposite direction so as to cause the rings to collapse into the recess 28A of the cup 28. Thus, with a fixed first ring 12, it will remain stationary; the second ring 14 and following rings will become disposed successively outside of ring 12 in a nested fashion one behind the other. Of course, the device 10 is also positioned and mounted on a camera 2 as noted hereinbefore, either before or after it is extended.

In FIG. 4, a fixed set of five rings is illustrated in partial sectional view. These rings are not of the collapsible type. The set is different from the aforementioned set, only in that the successive rings are permanently fixed to each other so they cannot collapse. All other functions and characteristics of the two sets are otherwise identical.

For purposes of describing the invention, the device 10 has been described as having five rings or elements. It should be understood, that the device 10 can operate with any number of rings, provided there are at least two. It is also possible for two or more rings to have the same color scheme. With such device, where the rings have the same color sections or segments, they are preferably positioned alternately with respect to each other so that the segmented bands or haloes exhibit an unusual and unique colored pattern about the object of a picture.

All of the rings are made of at least a translucent material. For example, a thin plastic material may be used. Each ring is made of a plurality of sections assembled together to form a 360° circular ring element having two or more colors. The sections are permanently joined to form one solid ring. These rings may be manually fabricated using suitable adhesives to hold all the segments together as a circular ring element. There may also be other methods of assembling the segments together, such as molding multisectioned pieces of different colors into a single ring element or piece. The seams or joints of such segmented rings may not be as sharply defined, but it need not be, as the colorations of the different segments blend into each other at such joints, in any event. The colors of the rings may be of any type depending upon the designs desired.

In a preferred embodiment, each ring may be made up of two or more equally sized ring segments. FIG. 3 shows one possible color scheme, for example, and FIGS. 4 and 5 illustrate yet other possibilities. In FIG. 3, ring 12 comprises 180° segments of red (30) and green (32) colors. Ring 14 is purple (34) and pink (36); ring 16 is red (38) and yellow (40); ring 18 is green (42) and yellow (44); and ring 20 is purple (46) and pink (48).

FIG. 5 shows a representation of a developed picture 52 with a halo 54 formed by the device 10 of the invention. As can be readily seen from the picture 52, the halo 54 formed by the colored rings produces a plurality of differently colored segments forming bands or rings of concentric circles. The inner band of the halo corresponds to the inner ring 12. Each successive band corresponds to each successive ring and so on until the outer band corresponds to the outer ring 20. Each color segment has been given a number corresponding to the ring segments shown in FIG. 3 so as to produce the concentric bands in the halo 54 of FIG. 5.

Figure 6:
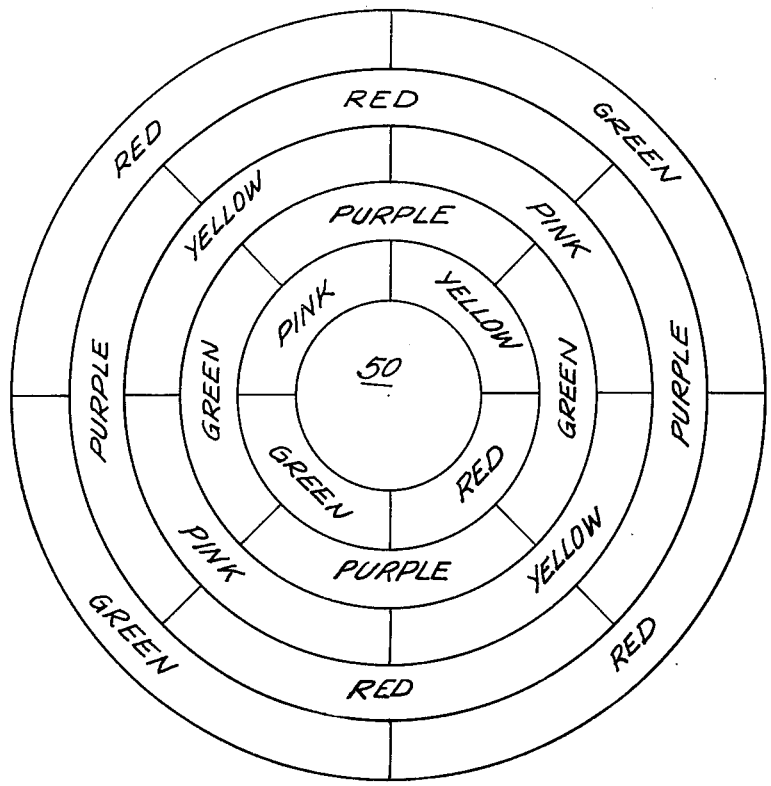
FIG. 6 is a schematic representation of another alternate ring structure for an improved optical framing device, with each ring fabricated from 90° segments.
Figure 7:
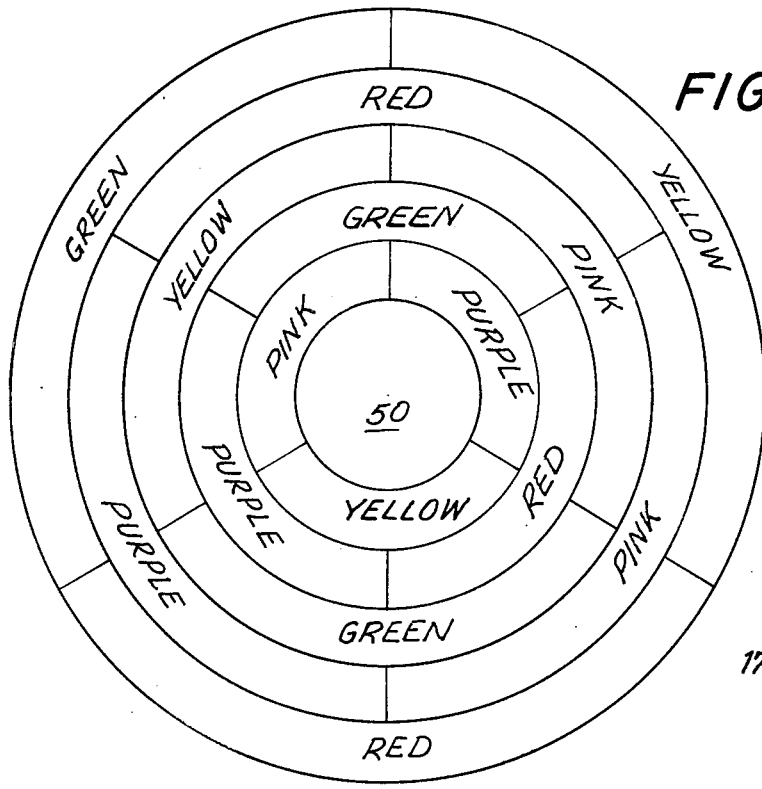
FIG. 7 is a schematic representation of yet another alternate ring structure with each ring fabricated from 120° segments.

FIGS. 6 and 7 show two other segmented ring color arrangements or patterns, and it is not believed necessary to show pictures or a photographic representation formed from these modified or alternate constructions. In FIG. 6, which shows one possible color pattern for a (90°) four-sectioned ring, it will be appreciated that the segments can be rotated relative to each other to produce even other colorations to the concentric bands. FIG. 7 therefor shows only one possible color scheme for a (120°) three-sectioned ring. With the various rings forming the colored segments in FIGS. 3, 6 and 7 rotated differently with respect to each other, other unexpected coloration patterns will obviously result. As it is possible to use any combination of rings with two or more sections, or even unequal sections or segments, all of such framing devices, whether uniformly assembled or mixed as in a device having rings of two, three, four and five segments, they all are considered to come within the scope of the invention.

For example, in FIG. 3, the phantom joints 100 on the second smallest ring are 120° segments, while the smallest ring is made up of 180° segments. The next size ring is made of 90° segments with the phantom lines or joints represented by the reference numeral 102. With such arrangements, unusual and unexpected color patterns are produced on a photograph.

Figure 8:
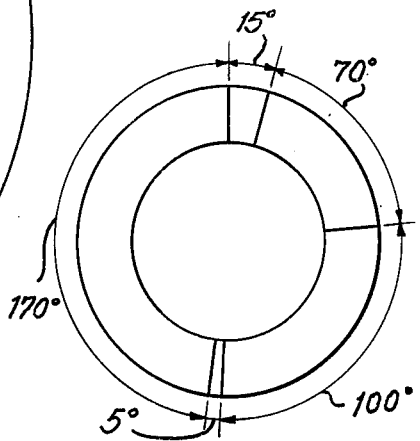
FIG. 8 is a schematic representation of a single ring element, illustrating five different angular segments, each of which may be of a different color.

Furthermore, with rings of unequally sized segments, such as illustrated in FIG. 8, even more unusual color patterns are produced. In this example, a ring may comprise five segments, made up of sections ranging in size from 5° to 170°. Each segment is marked with a reference line leading to its angular size.

Figure 9:
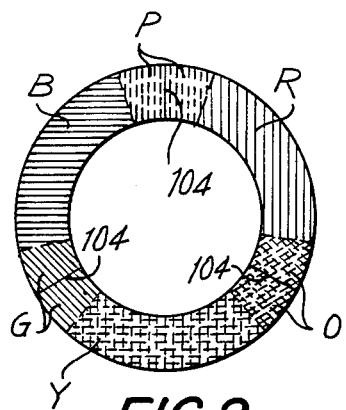

In another embodiment of the invention, wherein a ring is manufactured in a mold having, for example, plural color feed (three colors), the three colors would meet and blend or run into adjacent colors at the joint or boundary areas. As best shown in FIG. 9, thus a 120° segment (identified by the letter R) of a red color and a 120° segment (Y) of a yellow color would generate a small zone or segment (O) of an orange color. In a like manner, segments (G) and (P) formed respectively of green and purple colors would evolve at the two other boundary areas. Such a ring structure would provide unusual color patterns of unexpected concentrically formed color segments. Since the boundary areas would have varying shades of the same color, there would be no clear delineation or partition line establishing one color from the adjacent color, but only a zone of a single color, varying in shade or intensity, formed by the two colors.

In operation, the light from a subject passes through the passage means 50 in the device 10 and then enters the lens 6. Light exposing the film (not shown) causes an image to be produced thereon. In addition, the light passing through the various rings of the device and also passing through the lens creates the concentric background of the picture 52. Depending upon which section or segment of which ring the light goes through, such light, whether natural or artificial, will create a predetermined color pattern about a photograph. Each colored section or segment forms part of the halo 54 about or around the periphery of the apertured area of the picture 52.

Ideally, the lighting conditions should be uniform on all sides of the device 10, so that the halo 54 will be of uniform brightness. However, the device 10 performs satisfactorily even with uneven lighting, as would occur with a flash. In such an instance, the halo will generally be brighter in some places than in others, depending upon where the flash is held.

While the invention has been described, disclosed, illustrated and shown in terms of an embodiment or modification which it has assumed in practice, the scope of the invention should not be deemed to be limited by the precise embodiment or modification herein described, disclosed, illustrated or shown, such other embodiments or modifications as may be suggested to those having the benefit of the teachings herein being intended to be reserved especially as they fall within the scope and breadth of the claims here appended.

What is claimed is:

1. An improved optical framing device for a camera, comprising: a plurality of circular rings together forming a continuous hood-like device adapted to be attached about the lens of said camera, each of said circular rings being at least translucent and comprising a plurality of arcuate segments, said circular rings being concentrically positioned about a central axis of said optical framing device, the diameter of each ring successively decreasing from the front of said device to the portion of said device attached to said lens, and each ring comprising two or more differently colored arcuate segments, whereby light transmitted through said arcuate segments of said ring elements generate a halo effect of substantially concentric circular bands made up of arcuate segmental portions of light of different coloring or shading blended about the central image formed in said camera and on a developed photograph produced from film used in said camera.

2. The device according to claim 1, wherein said arcuate segments of said rings are unequal in angular size.

3. The device according to claim 1, wherein said arcuate segments of said rings are equal in angular size.

4. The device according to claim 3, wherein at least one of said arcuate rings comprises two differently colored segments.

5. The device according to claim 4, wherein all of said rings comprise two differently colored segments, and said arcuate rings are rotatably movable with respect to each other so that various halo effects can be produced.

6. The device according to claim 3, wherein said arcuate segments are 180° in angular size.

7. The device according to claim 3, wherein said arcuate segments are 120° in angular size.

8. The device according to claim 3, wherein said arcuate segments are 90° in angular size.

9. The device according to claim 3, wherein the number of arcuate segments of any one ring is different from the number of arcuate segments of any other adjacent ring.

10. The device according to claim 1, wherein said rings are fixed to each other forming a rigid hood-like device.

11. The device according to claim 1, wherein said rings are telescoping in construction so that they can be collapsed about the smallest sized ring.

12. The device according to claim 1, wherein the number of arcuate segments of each ring is different from the number of segments of at least one adjacent ring.

13. The device according to claim 1, wherein the number of arcuate segments is different for each ring, and said rings are adapted to dispose said arcuate segments in such a manner that a line through the joints of one ring does not intersect another line passing through the joints of a next adjacent ring.

14. The device according to claim 1, wherein said arcuate segments of said rings are fabricated from a plastic material and said rings are concentrically disposed.

* * * * *